United States Patent Office 3,122,534
Patented Feb. 25, 1964

3,122,534
AMYLOSE DERIVATIVES
Johannes Muetgeert and Alfred Schors, Delft, and Pieter Hiemstra, Veendam, Netherlands, assignors to Cooperatieve Verkoop-en Productievereniging van Aardappelmeel en Derivaten "Avebe" G.A., Veendam, Netherlands
No Drawing. Filed Jan. 28, 1959, Ser. No. 789,523
Claims priority, application Netherlands Feb. 4, 1958
16 Claims. (Cl. 260—209)

The invention relates to amylose derivatives.

One object of the invention is to provide amylose derivatives which are soluble in water of a temperature below 100° C. and which may even be soluble in cold water, thus giving aqueous solutions which are not only true solutions but also have a fair storage time before any gelation occurs.

Another object of the invention is to provide a method of making such derivatives in a substantially pure state which means especially that they are substantially free from salts such as, for example, sodium chloride, sodium sulphate, magnesium sulphate and other chlorides and sulphates.

Still other objects of the invention will become clear from the following description.

According to the invention the first step is to prepare amylose derivatives by introducing substituents in the amylose chain molecule with the provision that the degree of substitution (DS) will not surpass a certain limit. The degree of substitution, X, is defined as the average number of substituent groups per glucose unit present in the amylose chain molecule. According to the invention, the degree of substitution (DS) should not be higher than 0.20 and preferably even be below 0.17; for some types of derivative even a DS of below 0.16 is desired. The factors controlling these data are explained below.

By substituent is understood a substituent in the hydroxyl group; preferably an ether is meant, that is the substitution reaction should preferably be an etherification reaction.

The substitution reaction should preferably be carried out in a homogeneous system. If, as it is preferred, the substitution reaction is an etherification, such a homogeneous system is easily obtained because etherification reactions are nearly always carried out in an alkaline system and since amylose readily dissolves in an alkaline aqueous system the homogeneous system is automatically obtained. This is the main reason why etherification as the substitution reaction is preferred. Other substitution reactions such as an esterification could be used as well, in so far as the further steps of the process are involved, but it is not easy to let an esterification of amylose proceed in a homogeneous system; but this is to be preferred, because probably in a homogeneous system the substituents are substantially evenly distributed over the amylose chain molecule and it is believed that such a substantial even distribution of the substituents over the amylose chain molecule is an important reason why the process according to the invention leads to the desired results.

After the etherification, an amylose ether is obtained. By an amylose ether is understood a derivative formed by an etherification reaction on the hydroxylgroups of the amylose chain molecule. Not only methyl, ethyl and other alkyl ethers are meant but also ethers which are substituted in the ether group such as hydroxy alkyl ethers.

Such etherification reactions are in their general aspect well known in the art and they include the use of etherification agents such as dialkyl sulphates, alkylene oxides, alkylene chloro hydrines, styrene oxide, halo esters of aliphatic and araliphatic alcohols such as chloromethane and the like. They are carried out in an alkaline system.

The desired DS is controlled by the reaction conditions such as time, temperature and concentrations which can easily be found by any person skilled in the art. There are several known methods for determining the DS in the final product so that by varying the reaction conditions and listing the DS it is easily found by test experiments, which reaction conditions must prevail in order to attain a certain DS.

After the etherification has taken place the reaction mixture must be neutralized by addition of an acid. Then salts are formed. Now for industrial applications it is very important that the amylose derivative should be freed from salts.

This is a very difficult problem. It is conceivable that the salt could be removed by such methods as electrodialysis or dialysis, by using ion exchangers or by washing out with alcohols. But these processes are costly and sometimes require a rather complicated technique. Washing out with alcohol is at first sight the most simple method but if an alcoholic washing liquid is to be able to wash out such salts as sodium chloride or sodium sulphate, the washing liquid should contain a substantial amount of water. In an aqueous alcoholic liquid, however, the amylose ether is also more or less soluble, with the result that fatal losses of amylose ether would occur.

Therefore the next step according to the invention is to use salts which salt out the amylose derivative.

Such salts having multivalent anions are to be preferred, for instance, sodium or ammonium sulphate. If the cation also is multivalent, in many cases the effect of these salts is still stronger; a good example is magnesium sulphate.

In one embodiment of this second step magnesium sulphate is used as its aqueous solution which is simply added to the neutralized reaction mixture of the etherification without first recovering the amylose derivative. Then the amylose ether precipitates from the combined mixture of neutralized etherification mixture and magnesium sulphate solution.

Now a very surprising phenomenon is observed. After adding the salt or salt solution, especially the magnesium sulphate solution, the precipitated amylose ether can be washed out with plain water until it is entirely salt free, either after a very short storage time (namely if the DS is very low in the order of 0.01 to 0.05) or after a longer storage period in the salt-containing, especially magnesium sulphate containing solution (namely if the DS is substantially higher than 0.02 up to at most 0.20). It is of course also possible first to remove the amylose ether precipitate from the reaction mixture and to transfer it to a fresh solution of the salt such as a magnesium sulphate solution, and to keep it there for the time required to render it completely insoluble in plain cold water. On the other hand it is also possible to add the salt already before or during etherification but this is not to be preferred.

At any rate the amylose ether is, or has become by some storage time in the salt solution, insoluble in plain cold water. By cold water is understood water having a temperature substantially below 100° C., for instance water of room temperature. Owing to this property it is quite possible to wash the amylose ether with water until it is salt-free without appreciable losses of amylose derivative.

The amylose ether thus obtained is still soluble in hot water but it is not soluble in cold water. For many purposes it would, however, be very desirable to convert the amylose derivative thus obtained to an amylose ether which is again soluble in cold water and not in hot water only. This can be achieved, provided the DS is not too low, i.e., it must be higher than about 0.05 and preferably be from 0.10 to 0.15. In this case the amylose ether obtained after the washing-out step can again be rendered soluble in cold water by first dissolving it in hot water and then recovering it from the hot solution, for example by evaporation of the water. A very suitable method is to feed an aqueous dispersion of the washed-out amylose ether in cold water to heated rollers. Probably an immediate dissolution followed by a rapid evaporation of the water on the hot rollers takes place, and at any rate the final result is that from the rollers a substantially solid product more or less in sheet form is obtained which can be powdered and which is soluble in cold water.

The solutions of this final product (obtained after the washing-out and the heating-evaporation steps of an amylose ether with a DS exceeding 0.05) in plain cold water are true solutions. Depending on the concentration of the solution it will take some hours to some days before gelation phenomena occur in the solutions. In general an aqueous solution of about 5 percent by weight will show no gelation within 2 days, whereas a solution of about 20 percent by weight will show the beginnings of a gelation after a few hours.

If the DS is very low, in the order of 0.005 it will not be possible after the washing-out step to obtain an amylose ether which dissolves in hot water. In fact pure amylose can only be dissolved in plain water under pressure at temperatures well above 100° C. If on the other hand the DS lies substantially above about 0.18, washing-out of the salts becomes impracticable because of the solubility of the salt-containing amylose ether in water, even after it has ben kept in the salt solution which means that it cannot be insolubilized; a DS of 0.20 must certainly not be surpassed.

It has been found that a DS in the final salt-free amylose ether of about 0.05 will yield a product which cannot be made soluble in cold water, whereas for instance with a DS in the final salt-free amylose ether of about 0.15, after the treatment, for example, on the hot rollers, the final product can be dissolved in cold water. If the DS lies between these values the product will, after the hot-roller treatment, dissolve in water of a temperature between 100° C. and room temperature.

The etherification reaction takes place in an alkaline system. An aqueos system containing sodium hydroxide to such an extent, that the solution has a normality of between 0.5 and 5 N, is suitable.

The time during which the salted-out amylose derivative must be kept in the salt solution in order to render it cold water insoluble so that it can be washed out with cold water, depends mainly upon the DS. With magnesium sulphate as the salt solution and a DS in the order of 0.13 it was found, for instance, that for the amylose hydroxy ethyl ether to be insolubilized by keeping it in an aqueous solution containing 35 percent by weight of $MgSO_4.7$ aq, this time was less than 25 hours. In fact it is not necessary to use such a concentrated magnesium sulphate solution but then the storage time might become somewhat longer in comparable cases. The storage time which is necessary in a given process of manufacture in relation to the type of ether, the type of salt and the concentration of the salt solution can easily be determined by a test. To this end the salt-containing amylose ether is kept in salt solutions of varied concentrations during varied storage times. So a number of samples are obtained after filtrating or centrifuging the mother liquid. Each sample is then washed with plain water at 20° C. until it is salt-free, which can be checked by the usual analytical reactions on the washing water, and the loss of weight of amylose derivative is determined. Only those salt concentrations and storage times which yield amylose ether samples which during the washing-out step do not lose so much in weight that the process would be economically unattractive, are suitable. An analogous procedure can be followed for checking the type of salt and the concentration in which it must be used in the previous step of salting-out the amylose derivative in order to obtain a good yield.

Since the behaviour of the amylose derivative with respect to the salt solutions used to precipitate, and especially to insolubilize the amylose derivative, is of great importance it should be noted that at any rate those unsubstituted or substituted ether groups, which do not contain a group which ionizes in an aqueous medium, do not present difficulties. If, however, the ether group contains an ionic group, especially with salts having a multivalent cation, difficulties may be encountered. So with magnesium sulphate the amylose hydroxy ethyl ether (containing no ionic group) gives rather coarse particles which can very easily be filtered off or centrifuged but the sodium salt of the glycolic acid ether of amylose gives a tacky product which is difficult to handle.

By way of example a preparation of the amylose-hydroxyethylether will be described. The temperature during the whole process from the dissolution of the amylose in the alkaline medium up to and including the centrifugation of the mother liquid after the washing-out step, was the room temperature.

The material was dry amylose; 162 kilogrammes of this dry amylose were dissolved under nitrogen atmosphere in an aqueous solution of sodium hydroxide, namely in 850 kilogrammes of NaOH 1 N (containing 1 grammol NaOH per litre of solution) whilst stirring for 2½ hours. Then the etherification agent was added to this solution; it was ethylene oxide, which under normal conditions is a gas, but under slight pressure becomes a liquid. Under said slightly elevated pressure 15 kilogrammes of the liquid ethylene oxide was pressed into the alkaline amylose solution. After stirring for 135 minutes under nitrogen atmosphere the reaction mixture was neutralized with a commercial concentrated sulphuric acid solution to pH=7. Then an aqueous magnesium sulphate solution containing 50 kilogrammes of $MgSO_4.7$ aq per 100 litres of solution was added to the neutralized amylose ether solution in such an amount that the final mixture contained 350 kilogrammes of $MgSO_4.7$ aq per 1000 kilogrammes. This final mixture was stirred for 20 hours. A heavy precipitate was formed which was separated from the mother liquid by means of a normal centrifuge. The mother liquid was recycled after addition of so much $MgSO_4.7$ aq that it contained again 50 kilogrammes of $MgSO_4.7$ aq per 100 litres of liquid. The cake formed by the precipitate in the centrifuge was then washed with plain water until no appreciable amount of sulphate could be found in the spent washing liquid. It is safe to wash for ½ hours, but in fact the washing-out of the salts proceeds faster. A salt-free moist cake of amylose hydroxyethyl ether was obtained.

The cake was slurried in 100 litres of plain cold water. This slurry was fed to a system of steam-heated drying rollers (120° C.). A sheet was obtained. After powdering a white dry powder of amylose hydroxyethyl ether was obtained in an overall yield of 60%. This powder was readily soluble in plain cold water. The product had a DS of 0.13. A solution of 5 percent by weight of this powder in cold water did not show any gelation within 2 days.

If instead of 15 kilogrammes of ethylene oxide stoichiometrically equivalent amounts of ethylene chloro hydrine, of propylene oxide, of propylene chloro hydrine and of styrene oxide were used and for the rest the procedure was the same, quite analogous products were obtained. The methyl ether can in an analogous way be prepared for example by using dimethyl sulphate or chloromethane as the etherification agent.

As stated before, the temperature at which the final product dissolves in water depends on the DS but it is always below 100° C. The storage time before gelation occurs depends mainly on the concentration of the solution.

The true solutions thus obtained are excellently suitable for several purposes. Since it is possible to influence the temperature at which they dissolve in water by choosing a suitable DS, these products offer various possibilities. If a product is made which dissolves in hot but not in cold water, its aqueous solution can be used for coating purposes, for example for paper coating. The cold-water soluble products can be used for example for covering fruit or for treating materials which need only be temporarily protected. Films obtained from the solutions and which may be entirely soluble in cold water appear to be of fine appearance and can be handled without difficulties.

What we claim is:

1. A process for preparing amylose ethers which comprises etherifying amylose in an alkaline aqueous solution to a degree of substitution not exceeding 0.20, neutralizing the reaction mixture by addition of an acid, precipitating the amylose ether from the neutralized reaction mixture by adding a salt from the group consisting of sodium, magnesium and ammonium sulphates, said salt having been added at any time prior to said precipitation, separating the precipitated ether from the mixture and washing the ether with water until it is substantially salt-free.

2. The process of claim 1 wherein the salt from the group consisting of sodium, magnesium and ammonium sulphates is added to the reaction mixture after the neutralization step.

3. The process of claim 1 wherein the precipitated amylose ether in the neutralized reaction mixture is held in the presence of the salt from the group consisting of sodium, magnesium and ammonium sulphates until the ether is substantially insoluble in cold water.

4. The process of claim 1 wherein the etherifying agent employed contains no water-ionizable groups.

5. The process of claim 1 wherein the etherifying agent is ethylene oxide.

6. The process of claim 1 wherein the etherifying agent is ethylene chlorohydrin.

7. The process of claim 1 wherein the etherifying agent is propylene oxide.

8. The process of claim 1 wherein the etherifying agent is propylene chlorohydrin.

9. The process of claim 1 wherein the etherifying agent is styrene oxide.

10. The process of claim 1 wherein the etherifying agent is dimethyl sulphate.

11. The process of claim 1 wherein the etherifying agent is chloromethane.

12. The process of claim 1 wherein the salt is magnesium sulphate.

13. A process for preparing amylose ethers as defined in claim 1 wherein the degree of substitution of the amylose ether is greater than 0.05 but less than 0.20.

14. A process for preparing cold-water soluble amylose ethers which comprises etherifying amylose in an alkaline aqueous solution to a degree of substitution which is greater than 0.05 and not exceeding 0.20, neutralizing the reaction mixture, precipitating the amylose ether from the neutralized reaction mixture by adding a salt from the group consisting of sodium, magnesium and ammonium sulphates, said salt having been added at any time prior to said precipitation, holding the precipitated ether in the presence of the salt until it becomes substantially insolubilized in cold water, separating the precipitated ether from the mixture, washing the ether with cold water until it is substantially salt-free, dissolving the salt-free ether in water at an elevated temperature not exceeding 100° C., and removing the water from the resulting solution.

15. The process of claim 14 wherein the water is removed by evaporation.

16. An amylose ether prepared according to claim 14.

References Cited in the file of this patent

UNITED STATES PATENTS

| | | |
|---|---|---|
| 2,541,773 | Lolkema | Feb. 13, 1951 |
| 2,775,586 | Paschall | Dec. 25, 1956 |
| 2,786,833 | Wurzburg et al. | Mar. 26, 1957 |
| 2,813,093 | Gordon et al. | Nov. 12, 1957 |
| 2,858,305 | Kerr | Oct. 28, 1958 |
| 2,923,704 | Berger et al. | Feb. 2, 1960 |
| 3,038,895 | Rutenberg et al. | June 12, 1962 |

OTHER REFERENCES

Chemical Abstracts, vol. 33, 1939, column 1986.

Industrial and Engineering Chemistry, vol. 36, No. 9, September 1944, pages 796–798.

Journal American Chemical Society, vol. 73, January 1951, pages 346–349.

Industrial and Engineering Chemistry, vol. 49, No. 8, August 1957, pages 1247 and 1248.

Cereal Science Today, vol. 3, No. 8, October 1958, pages 206–209.